United States Patent
Cho et al.

(10) Patent No.: US 9,030,781 B1
(45) Date of Patent: May 12, 2015

(54) DETECTING STRAY MAGNETIC FIELDS IN A STORAGE DEVICE

(71) Applicant: Seagate Technology LLC, Cupertino, CA (US)

(72) Inventors: YoChan Cho, Hwasong-si (KR); HooSan Lee, Gyeonggi-Do (KR); JungWook Hur, Gyeonggi-Do (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/530,698

(22) Filed: Nov. 1, 2014

(51) Int. Cl.
G11B 5/39 (2006.01)
G11B 5/31 (2006.01)

(52) U.S. Cl.
CPC ............ *G11B 5/3951* (2013.01); *G11B 5/3106* (2013.01)

(58) Field of Classification Search
None
See application file for complete search history.

(56) References Cited

U.S. PATENT DOCUMENTS

| | | | | |
|---|---|---|---|---|
| 4,296,447 A * | 10/1981 | Lewis | ............................ | 360/66 |
| 5,535,074 A | 7/1996 | Leung | | |
| 5,576,915 A * | 11/1996 | Akiyama et al. | ............... | 360/314 |
| 6,069,761 A * | 5/2000 | Stupp | ............................. | 360/66 |
| 7,289,284 B2 | 10/2007 | Arai et al. | | |
| 7,501,928 B2 * | 3/2009 | Shoji | ........................... | 338/32 R |
| 7,786,725 B2 | 8/2010 | Furukawa et al. | | |
| 7,859,789 B2 | 12/2010 | Partee | | |
| 2004/0061978 A1 * | 4/2004 | Kawato | ........................ | 360/314 |
| 2004/0085670 A1 * | 5/2004 | Li et al. | ........................... | 360/75 |
| 2006/0023333 A1 * | 2/2006 | Hachisuka et al. | ............. | 360/66 |
| 2006/0291106 A1 * | 12/2006 | Shoji | ........................ | 360/324.11 |
| 2007/0076332 A1 * | 4/2007 | Shoji et al. | ............... | 360/324.12 |
| 2009/0207531 A1 * | 8/2009 | Shiimoto et al. | .............. | 360/316 |
| 2011/0025320 A1 * | 2/2011 | Ohta et al. | .................... | 324/252 |
| 2011/0216432 A1 | 9/2011 | Yanagisawa | | |

* cited by examiner

*Primary Examiner* — Peter Vincent Agustin
(74) *Attorney, Agent, or Firm* — Taylor English Duma LLP

(57) ABSTRACT

Technologies are described herein for detecting an external magnetic field affecting a magnetic storage device through use of the read/write heads of the device. The magneto-resistive resistance ("MRR") associated with a pair of read/write heads oriented to read and write opposite recording surfaces of the storage medium. If the change in the MRR associated with the first read/write head is in an inverse direction to the change in MRR associated with the second read/write head and the change in the MRR of either read/write head exceeds a threshold, then all operations of the storage device are halted and the read/write heads are parked.

20 Claims, 4 Drawing Sheets

DETECTING STRAY MAGNETIC FIELDS IN A STORAGE DEVICE

BRIEF SUMMARY

The present disclosure relates to technologies for detecting an external magnetic field affecting a magnetic storage device, such as a hard-disk drive ("HDD") device, through use of the read/write heads of the device. According to some embodiments, a method for detecting an external magnetic field affecting the storage device comprises monitoring the magneto-resistive resistance ("MRR") associated with a pair of read/write heads oriented to read data from opposite recording surfaces of the storage medium. It is determined whether the change in the MRR associated with the first read/write head is in an inverse direction to the change in MRR associated with the second read/write head. If it is determined that that the change in the MRR associated with the first read/write head is in an inverse direction to the change in MRR associated with the second read/write head, it is then determined whether the change in the MRR of either read/write head exceeds a threshold. If the change in the MRR of either read/write head exceeds the threshold, then all operations of the storage device are halted.

According to further embodiments, a computer-readable medium contains processor-executable instructions that cause the controller of a storage device to read magneto-resistive resistance ("MRR") values associated with a first read/write head and a second read/write head of the storage device, the second read/write head being configured to read and write an opposite recording surface of the storage medium from the recording surface read and written by the first read/write head. The controller determines whether the change in the MRR value associated with the first read/write head is in an inverse direction of the change in the MRR value associated with the second MR read/write head, and if the change in the MRR value associated with the first read/write head is in the inverse direction of the change in the MRR value associated with the second MR read/write head, it is determined whether the change in the MRR values associated with either read/write head exceeds a threshold amount. If the change in the MRR value associated with either read/write head exceeds the threshold amount, all operations of the storage device are halted.

According to further embodiments, a system comprises a first magneto-resistive ("MR") reader element oriented to read data from a first recording surface of a storage medium and a second MR reader element oriented to read data from a second recording surface of the storage medium, the second recording surface being opposite of the first recording surface. The system further comprises an external field detection module configured to monitor the resistance of the first and second MR reader elements, and determine whether a change in the resistance of the first MR reader element is in an opposite direction of any change in the resistance of the second MR reader element. Upon determining that the change in the resistance of the first MR reader element is in an opposite direction of the change in the resistance of the second MR reader element, the external field detection module determines whether the change in the resistance of either MR reader element exceeds a threshold value, and upon determining that the change in the resistance of either MR reader element exceeds the threshold value, an alarm is generated in the storage device.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for detecting an external magnetic field affecting a magnetic storage device through use of the read/write heads of the device. A typical storage device may include a hard-disk drive ("HDD") device. The HDD device may contain magnetic media comprising one or more disks having magnetic recording surfaces upon which information is stored. One or more read/write heads may be utilized to write data to and read data from each of the recording surfaces. When an external magnetic field is present within proximity to the HDD and a read/write head is operated above a recording surface, information written on the recording surface may be erased or damage.

Typically, when a read/write head is exposed to the external magnetic field, the field flows through the write head shield and the write pole. For example, when the read/write head is performing a write operation, the magnetic field for the write operation and the external magnetic field flow through the write pole, and when the head is utilized for a read operation, the external magnetic field flows through both ends of the write head shield. If the read/write head is positioned over the magnetic recording surface in the presence of an excessive magnetic field, data tracks adjacent to the head position may be erased along with servo patterns written to the recording surfaces. This may lead to loss of data, decreased reliability of the HDD, and/or permanent failure of the device.

According to embodiments presented herein, a novel method of detecting the presence of an external magnetic field affecting the read/write heads of a storage device may be implemented that utilizes measurement of the change in resistance of magneto-resistive ("MR") reader elements in the read/write heads instead of requiring the use of additional hardware and/or circuitry, such as a magnetic field detection circuit. By detecting the external magnetic field by the heads before track or servo erasures occur, overall reliability of the storage device may be improved.

Figure 1:
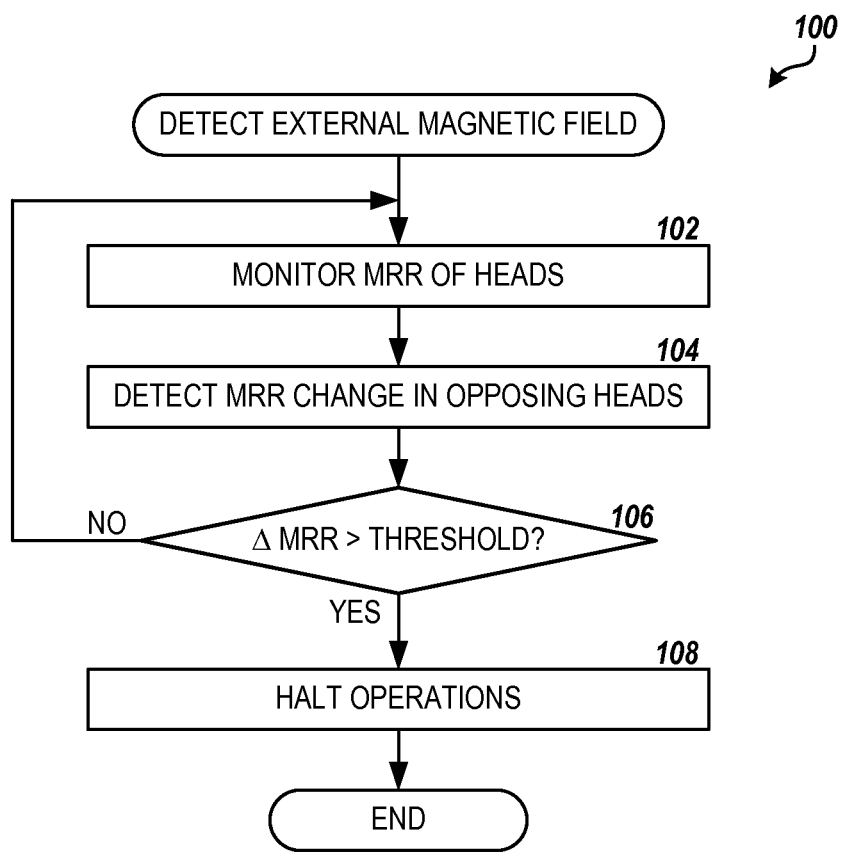
FIG. 1 is a flow diagram showing one method for detecting an external magnetic field using the read/write heads of a storage device, according to embodiments described herein.

FIG. 1 shows aspects of such a method for detecting the presence of an external magnetic field, according to the embodiments described herein. Specifically, FIG. 1 illustrates one routine 100 for detecting an external magnetic field using the read/write heads of a storage device. According to some embodiments, the routine 100 may be performed by a controller of the storage device during the normal operating mode, or "user mode," of the device. The routine 100 includes step 102, where the resistance of MR reader elements in the read/write heads is continuously monitored during normal operations of the storage device as well as when the device is idle, e.g. while the heads are parked on the ramp and away from the recording surfaces of the magnetic media. According to some embodiments, the magneto resistive resistance ("MRR") of the reader elements in the read/write heads may be acquired by the controller from the pre-amplifier for the heads.

From step 102, the routine 100 proceeds to step 104, where a change in MRR of the reader elements in opposing heads is detected. According to embodiments, the MRR associated with a pair of read/write heads reading opposite recording surfaces of the same disk is affected inversely in the presence of an external magnetic field. That is, the MRR associated a read/write head adjacent to a first surface of the disk changes in an opposite direction than the MRR associated with the read/write head adjacent to the opposite surface. Although the MRR of the read/write heads of a storage device may change over time due to head wear or instability, it is rare for the MRR of one head to change in an opposite manner to an opposing head, and thus this occurrence is a good indication of the presence an external magnetic field affecting the storage device.

For example, in the presence of a particular external magnetic field, the MRR of the reader element of a read/write head adjacent to a top surface of a disk (referred to herein as the "down head") may decrease while the MRR of the reader element of a read/write head adjacent to the bottom surface of the disk (referred to herein as the "up head") increases. It will be appreciated that an external magnetic field of an opposite polarity may cause the MRR of the down head to increase while the MRR of the up head decreases. It will be further appreciated that terms such as "top surface," "bottom surface," "up head," "down head," and the like are utilized herein to identify pairs of opposing heads and are not meant to limit the disclosure to any particular configurations of the read/write heads, disks, or other components and/or orientation of the storage device.

When an opposite change in the MRR of opposing heads is detected indicating the presence of an external magnetic field, the routine 100 proceeds from step 104 to step 106, where it is determined if the change in MRR of either of the opposing read/write heads exceeds a threshold amount. For example, the change in MRR of the read/write heads as a percentage of a reference MRR may be determined. The reference MRR may vary by read/write head within the storage device and may be determined for each head during certification ("CERT") processing of the storage device. The percentage change in MRR of the head may be compared to a threshold percentage, such as 5%. In some embodiments, the controller may determine if the change in MRR for both read/write heads exceeds the threshold amount.

If the change in MRR of one or both of the opposing heads exceeds the threshold amount, then the routine proceeds from step 106 to step 108, where all operations of the heads are halted in order to avoid erasure of adjacent track data and/or servo patterns on the recording surfaces. Halting operations may include canceling any current operation and parking the read/write heads on the ramp so that the heads are removed from the magnetic recording surfaces until the external magnetic field is no longer present. In addition, an alarm may be raised to a host system containing the storage device so that no more read/write operations are sent. From step 108, the routine 100 ends.

Figure 2:
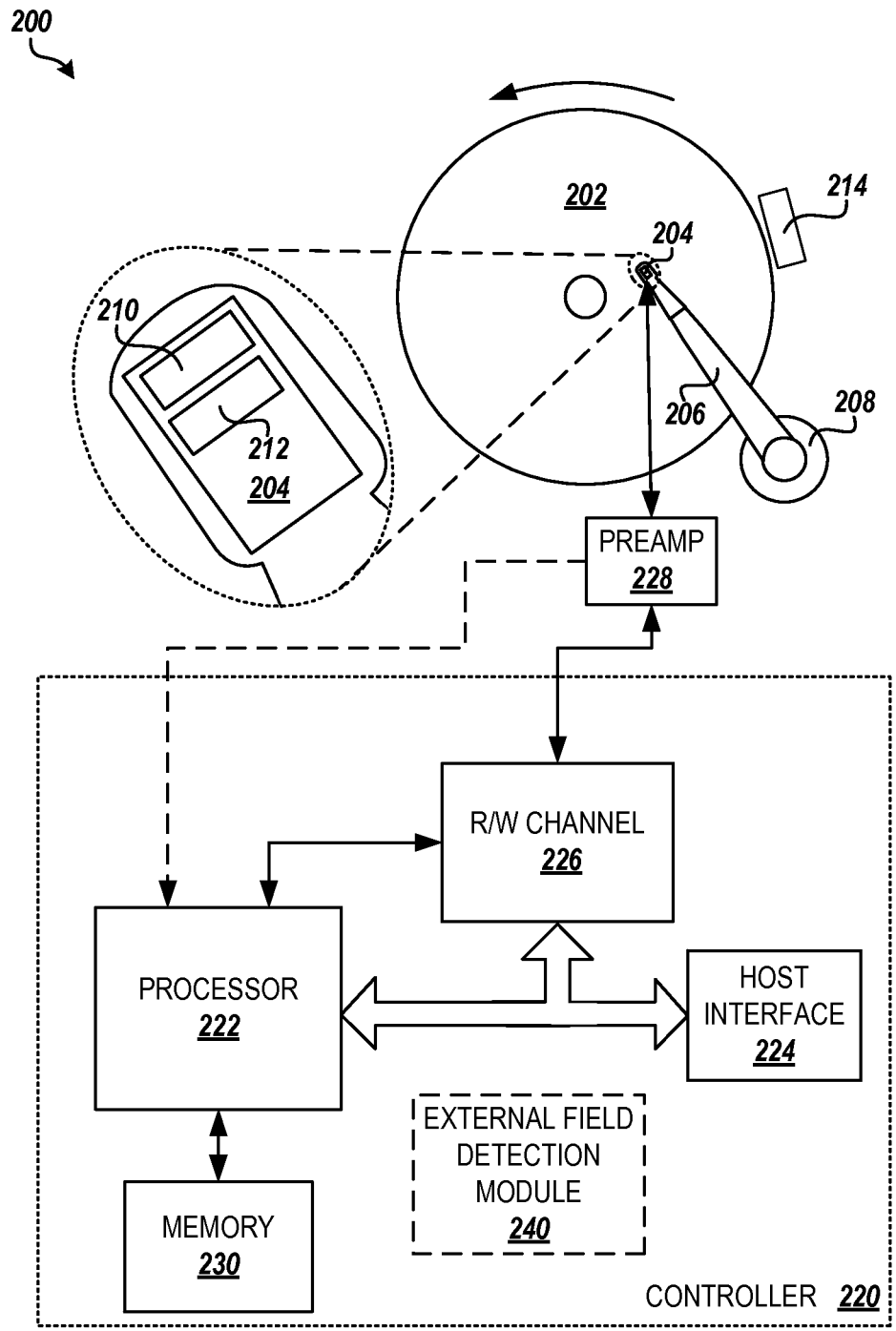
FIG. 2 is a block diagram showing an illustrative environment for detecting an external magnetic field affecting a magnetic storage device through use of the read/write heads of the device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for detecting an external magnetic field in a storage device, according to the embodiments provided herein. As discussed above, the storage device 200 may include recording media comprising at least one platter or disk 202. The disk 202 may include magnetic recording surfaces on opposing sides.

Figure 3:
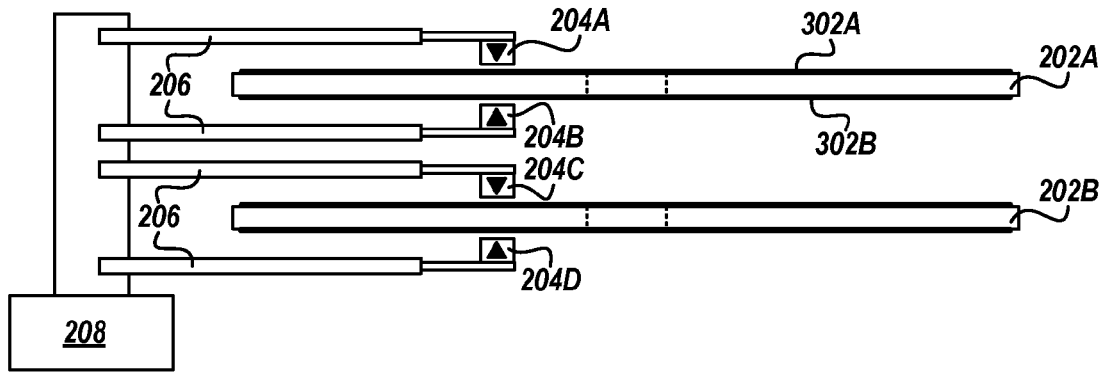
FIG. 3 is a block diagram showing an illustrative configuration of multiple read/write heads in a typical magnetic storage device.

The storage device 200 further includes a read/write head 204 located adjacent to each recording surface on the disks 202. The read/write head 204 may read information from the disk 202 by sensing a magnetic field formed on portions of the magnetic recording surface, and may write information to the disk by magnetizing a portion of the recording surface. As shown in FIG. 3, the storage device may comprise a number of disks, such as disks 202A and 202B, each with opposing magnetic recording surfaces 302A and 302B (referred to herein generally as recording surfaces 302). Each recording surface 302 has an associated read/write head 204A-204D. One read/write head of a pair of read/write heads associated with opposing recording surfaces 302A and 302B, such as read/write head 204A, may be referred to as the "down head," while the other read/write head 204B of the pair is referred to as the "up head." The read/write heads 204A-204D may be attached to the distal end of associated arms 206, the arms further attached to a single actuator 208 that moves the heads as a unit across their associated magnetic recording surfaces 302.

Returning to FIG. 2, the read/write heads 204 may comprise multiple components. According to embodiments, the read/write heads 204 include at least one writer 210 and at least one reader 212. The writer 210 may include an inductive writer element and the reader 212 may comprise a MR or tunneling magneto resistive ("TMR") reader element. It will be appreciated that the read/write heads 204 may include other components not shown in the figure or described herein, such as writer shield, a fly-on-demand ("FOD") head heater, a slider, and the like. The storage device 200 may further comprise a dock or ramp 214. The ramp 214 may provide a location for safely "parking" the read/write head 204 away from the magnetic recording surfaces 302 of the disk 202 when not in use. In some embodiments, the ramp 214 may be located in other areas off the disk 202, such as at the inner off disk portion. Alternatively, in some embodiments, instead of an off-disk ramp 214, an on-disk landing zone located at either the inner or outer diameter of the disk 202 where no user data is stored may be utilized and be part of this disclosure.

The storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the recording surface 302 of the disk(s) 202. The processor 222 may further process read commands from the host device by determining the location of the desired data on the surface of the disk 202, moving the read/write head(s) 204 over the determined location, reading the data from the surface of the disk via the read/write channel 226, correcting any errors and formatting the data for transfer to the host device.

The read/write channel 226 may convert data between the digital signals processed by the processor 222 and the analog signals conducted through the read/write heads 204 for reading and writing data to the recording surfaces 302 of the disk 202. The analog signals to and from the read/write heads 204 may be further processed through a pre-amplifier 228. The pre-amplifier 228 may further allow the processor 222 to read the MRR of the reader element(s) of each read/write head 204. The read/write channel 226 may further provide servo data read from the recording surfaces 302 of the disks 202 to the actuator 208 to position the read/write heads 204. The read/write heads 204 may be moved radially across the surfaces of the disks 202 using the actuator 208 while a motor rotates the disk to bring the target location for the read/write operation under the read/write head.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the non-volatile memory and/or the RAM may store a firmware that comprises commands and data necessary for performing the operations of the storage device 200. According to some embodiments, the memory 230 may store processor-executable instructions that, when executed by the processor 222, perform the routines 100 and 500 for detecting an external magnetic field using the read/write heads 204 of the storage device 200, as described herein.

In addition to the memory 230, the environment may include other computer-readable media storing program modules, data structures, and other data described herein for detecting an external magnetic field using the read/write heads 204 of a storage device 200. It will be appreciated by those skilled in the art that computer-readable media can be any available media that may be accessed by the controller 220 or other computing system for the non-transitory storage of information. Computer-readable media includes volatile and non-volatile, removable and non-removable storage media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include an external field detection module 240. The external field detection module 240 may monitor the MRR associated with the read/write heads 204 in order to detect an external magnetic field affecting the storage device 200 and halt read/write operations until the external field is removed, as described in the embodiments presented herein. According to some embodiments, the external field detection module 240 may be implemented in the controller 220 as software, hardware, or any combination of the two. For example, the external field detection module 240 may be stored in the memory 230 as part of the firmware of the storage device 200 and may be executed by the processor 222 for performing the methods and processes described herein. The external field detection module 240 may alternatively or additionally be stored in other computer-readable media accessible by the controller 220. In further embodiments, the external field detection module 240 may be implemented in a computing system external to and operably connected to the storage device 200, such as in a driver module of a host device connected to storage device through the interface 224, for example. The external field detection module 240 may further be stored in a memory or other computer-readable media accessible by the computing system and be executed by a processor of the computing system.

It will be appreciated that the structure and/or functionality of the storage device 200 may be different that that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 4:
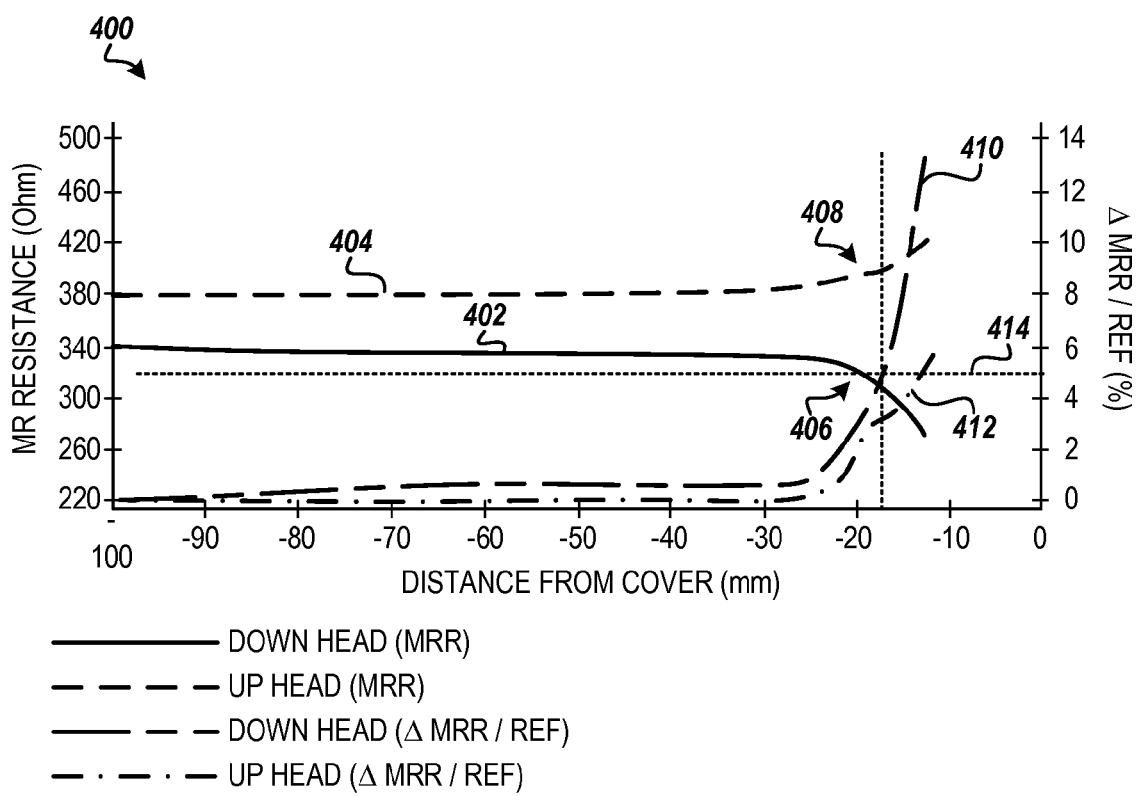
FIG. 4 is a graph showing aspects of the change in resistance of magneto-resistive readers in the presence of an external magnetic field, according to embodiments described herein.

FIG. 4 provides additional details of the methods described herein for detecting an external magnetic field affecting a magnetic storage device through use of the read/write heads of the device. The illustrative graph 400 shown in FIG. 4 includes plot lines 402 and 404 that show the MRR values of the reader elements in the down head 204A and up head 204B, respectively, of a pair of opposing read/write heads as a source of an external magnetic field is moved closer to the cover of the storage device 200. As shown at 406 and 408, the MRR value associated with the down head 204A decreases sharply as the source of the external magnetic field gets close to the cover, while the MRR value associated with the up head 204B increases.

According to some embodiments, the external field detection module 240 or other components of the controller 220 monitors the MRR values of the read/write heads 204A, 204B, and when an inverse change in the MRR is detected from a pair of opposing heads, as shown at 406 and 408 in FIG. 4, it is determined that an external magnetic field may be present that is affecting the storage device 200. If an external magnetic field is detected, the external field detection module 240 may further determine the change in MRR associated with each of the heads 204A, 204B as a percentage of a reference MRR corresponding to each head, as shown by plot lines 410 and 412 in the graph 400. For example, the reference MRR corresponding to the down head 204A may be 342 ohms while the reference MRR corresponding to the up head 204B may be 379 ohms. The reference MRR for each read/write head 204 may be determined at "burn-in" or CERT processing of the storage device 200, and may be stored in the memory 230 or other storage area of the storage device 200, such as the maintenance cylinder of the recording media. In some embodiments, the reference MRR for each read/write head 204 may be periodically updated to account for change over time from head wear, for example.

According to some embodiments, if the change in MRR associated with one or both read/write heads 204A, 204B as a percentage of the corresponding reference MRR exceeds a threshold percentage, then all read/write operations for the storage may be halted. For example, as shown at 414 in the graph 400, the change in MRR as percentage of the corresponding reference MRR of the down head 204A exceeds a threshold percentage of 5% as the source of the external magnetic field approaches 17 mm from the storage device. At this point, the external field detection module 240 may halt all read/write operations for the read/write heads 204A and 204B and park the heads in the in the ramp 214 to avoid potential erasure of user data or servo patterns that may occur when operating the heads over the recording surfaces 302 of the disks 202 in the presence of a strong, external magnetic field.

Figure 5:
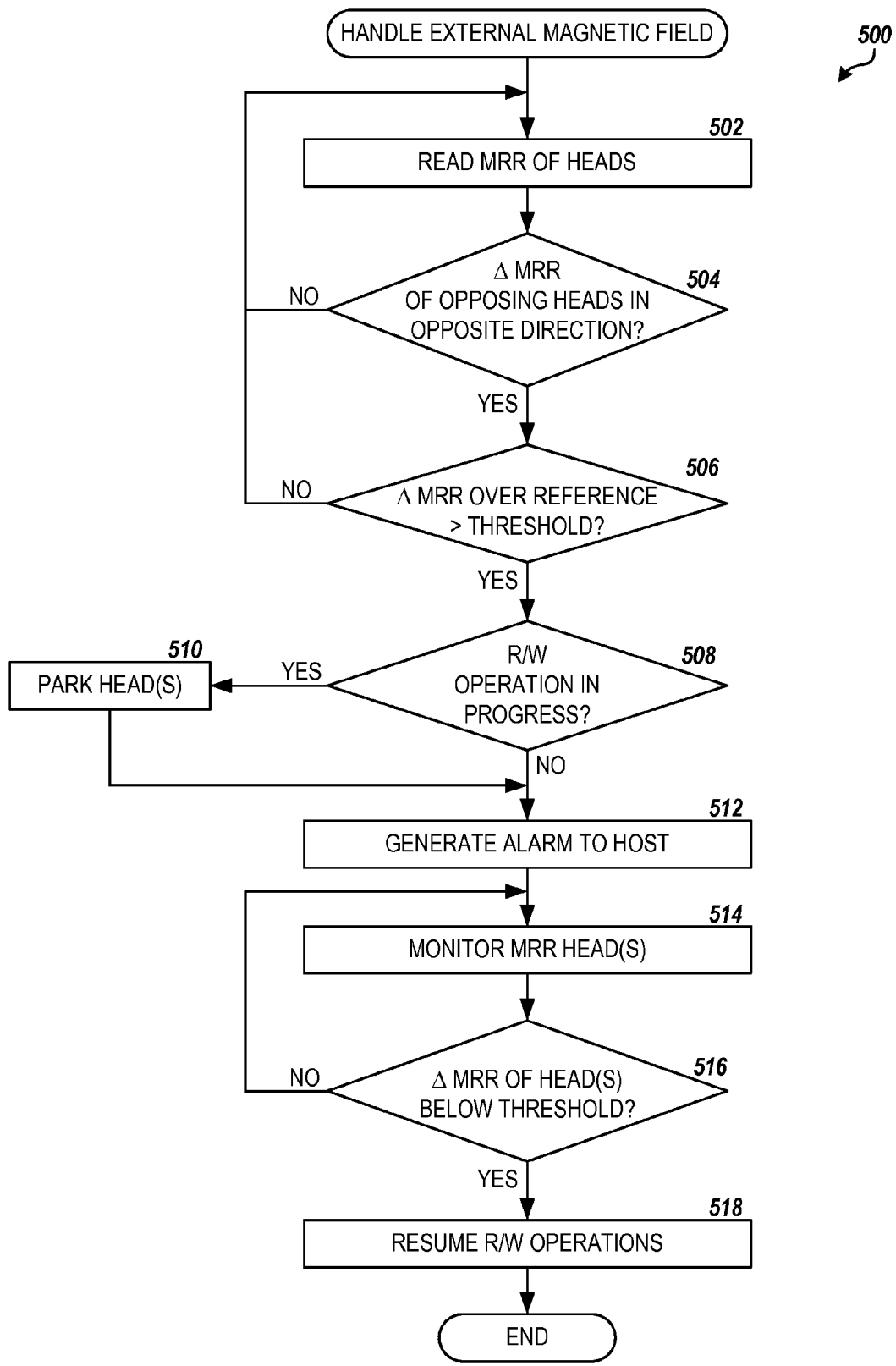
FIG. 5 is a flow diagram showing another routine for handling an external magnetic field affecting a magnetic storage device, according to embodiments described herein.

FIG. 5 illustrates one routine 500 for detecting and handling the presence of an external magnetic field affecting a storage device 200, according to some embodiments. In some embodiments, the routine 500 may be performed by the external field detection module 240 while the storage device 200 is operating in the user mode. In further embodiments, the routine 500 may be performed by the controller 220 of the storage device 200, by external processors or computing systems accessing data from the device or some other combination of modules, processors and devices.

The routine 500 begins at step 502, where the external field detection module 240 periodically reads the resistance of the MR reader elements in the read/write heads 204 of the storage device 200. As described above, the MRR associated with the read/write heads 204 may be continuously monitored during normal operations of the storage device as well as when the device is idle, e.g. while the heads are parked on the ramp 214 and away from the recording surfaces 302 of the disks 202. The MRR of the read/write heads may be acquired by the external field detection module 240 through the pre-amplifier 228, for example.

From step 502, the routine 500 proceeds to step 504, where external field detection module 240 determines whether an inverse change in MRR associated with a pair of opposing read/write heads has occurred, such as the change in MRR of the down head 204A and the up head 204B described above in regard to FIG. 4 as the source of the external magnetic field approaches the storage device 200. If no inverse change of MRR in opposing heads is detected, the routine 500 returns to step 502, where the external field detection module 240 continues monitoring the MRR of the read/write heads 204 of the storage device.

If an inverse change in the MRR associated with a pair of opposing read/write heads 204 is detected, indicating the potential presence of an external magnetic field, then the routine 500 proceeds from step 504 to step 506, where the external field detection module 240 determines if the change in MRR associated with either of the pair of opposing heads exceeds a threshold level. For example, as described above in regard to FIG. 4, the external field detection module 240 may calculate the change in MRR of the read/write heads 204A, 204B as a percentage of a reference MRR value corresponding to each head. According to some embodiments, the reference MRR may vary by read/write head 204 within the storage device 200. In some embodiments, the reference MRR for each read/write head 204 may be determined at "burn-in" or CERT processing of the storage device 200, and may be stored in the memory 230 or other storage area of the storage device 200, such as the maintenance cylinder of the recording media. In further embodiments, the reference MRR for each read/write head 204 may be periodically updated to account for change in the base MRR of the head over time.

If the external field detection module 240 determines that the change in MRR of one or both of the read/write heads 204A, 204B as a percentage of their corresponding reference MRR values does not exceed a threshold percentage, such as 5%, the routine 500 returns to step 502, where the external field detection module 240 continues monitoring the MRR of the read/write heads 204 of the storage device. If the external field detection module 240 determines that the change in MRR of one or both of the read/write heads 204A, 204B as a percentage of their corresponding reference MRR values does exceed the threshold percentage, then the routine 500 proceeds from step 506 to step 508, where the external field detection module 240 determines if the storage device is currently processing a read/write operation, i.e. if the read/write heads 204 are currently operating above the recording surfaces 302 of the disks. If a read/write operation is currently in progress, the routine 500 proceeds to step 510, where the external field detection module 240 causes the read/write heads 204 to be immediately parked, such as by moving the heads over the ramp 214.

Next, at step 512, the external field detection module 240 generates an alarm to the host in order to halt any additional read/write operations being sent to the storage device 200 until the external magnetic field is removed, according to some embodiments. In some embodiments, the external field detection module 240 may continue to monitor the MRR associated with the read/write heads 204, as shown at step 514, after read/write operations of the storage device 200 have been halted. If the external field detection module 240 determines that the change in MRR for both read/write heads 204A, 204B has dropped below the threshold amount indicating removal of the external magnetic field, as shown at step 516, the routine 500 proceeds to step 518, where normal operations of the storage device may be resumed. From step 518, the routine 500 ends.

Based on the foregoing, it will be appreciated that technologies for detecting an external magnetic field affecting a magnetic storage device through use of the read/write heads of the device are presented herein. While embodiments are described herein in regard to an HDD device, it will be appreciated that the embodiments described in this disclosure may be utilized in any storage device using magnetic recording media and MR reader elements, including but not limited to, a magnetic disk drive, a hybrid magnetic and solid state drive, a magnetic tape drive, and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may,"

unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method of detecting an external magnetic field affecting a storage device, the method comprising:
   monitoring a resistance of a first magneto-resistive ("MR") reader element and a second MR reader element, the first MR reader element oriented to read data from a first recording surface of a storage medium in the storage device, and the second MR reader element oriented to read data from a second recording surface opposite the first recording surface;
   determining whether a change in the resistance of the first MR reader element is in an inverse direction of a change in the resistance of the second MR reader element;
   upon determining that the change in the resistance of the first MR reader element is in an inverse direction of the change in the resistance of the second MR reader element, determining whether the change in the resistance of the first or second MR reader elements exceeds a threshold amount; and
   upon determining that the threshold amount is exceeded, halting operations of the storage device.

2. The method of claim 1, wherein halting operations of the storage device comprises moving read/write heads containing the first MR reader element and the second MR reader element to an area not above the recording surfaces of the storage medium.

3. The method of claim 1, wherein halting operations of the storage device comprises generating an alarm to a host system connected to the storage device.

4. The method of claim 1, wherein monitoring the resistance of the first MR reader element and the second MR reader element is performed while read/write heads containing the first MR reader element and the second MR reader element are parked on a ramp of the storage device.

5. The method of claim 1, wherein determining whether the change in the resistance of the first or second MR reader elements exceeds a threshold amount comprises determining the change in the resistance of the MR elements as a percentage of a reference MR resistance ("MRR") value corresponding to each of the MR elements and comparing the change in the resistance of the MR elements to a threshold percentage value.

6. The method of claim 5, wherein the reference MRR of each head is determined during certification processing of the storage device.

7. The method of claim 1, further comprising:
   upon halting operations of the storage device, determining whether the external magnetic field has been removed from the storage device; and
   upon determining that the external magnetic field has been removed from the storage device, resuming normal operations of the storage device.

8. The method of claim 1, wherein the storage medium comprises a magnetic surface of a disk in a hard disk drive and the second recording surface is on a same disk as the first recording surface.

9. A non-transitory computer-readable medium having processor-executable instructions stored thereon that, when executed by a processor, cause the processor to:
   read a first magneto-resistive resistance ("MRR") value associated with a first read/write head of a storage device;
   read a second MRR value associated with a second read/write head of the storage device, the second read/write head configured to read and write an opposite recording surface of a storage medium from a recording surface read by the first read/write head; and
   if a change in the first MRR value is in an inverse direction of a change in the second MRR value and the change in the first or second MRR values exceeds a threshold amount, then halting operations of the storage device.

10. The computer-readable medium of claim 9, having further processor-executable instructions stored thereon that cause the processor to:
    upon determining that the change in the MRR value associated with either read/write head exceeds the threshold amount, cause the read/write heads to be parked on a ramp of the storage device.

11. The computer-readable medium of claim 9, wherein halting operations of the storage device comprises generating an alarm to a host system connected to the storage device and the opposite recording surface is on a separate storage medium than the recording surface read by the first read/write head.

12. The computer-readable medium of claim 9, wherein reading the MRR value associated with the read/write heads is performed during a writing operation of the storage device.

13. The computer-readable medium of claim 9, wherein determining whether the change in the MRR value associated with a read/write head exceeds a threshold amount comprises determining a change in the MRR value as a percentage of a reference MRR value corresponding to the read/write head and comparing the change in the MRR value to a threshold percentage value.

14. The computer-readable medium of claim 13, wherein the reference MRR of each read/write head is determined during certification processing of the storage device.

15. The computer-readable medium of claim 9, having further processor-executable instructions stored thereon that cause the processor to:
    upon halting operations of the storage device, monitor the MRR values associated with the first and second read/write heads; and
    upon determining that the change in the MRR value associated with both read/write heads is less than the threshold amount, resuming normal operations of the storage device.

16. A system comprising:
    a first reader element oriented to read data from a first recording surface of a storage medium in a storage device;

a second reader element oriented to read data from a second recording surface of the storage medium, the second recording surface being opposite of the first recording surface; and a field detection module configured to
monitor a resistance of the first reader element,
monitor a resistance of the second reader element,
determine whether a change in the resistance of the first reader element is in an opposite direction of a change in the resistance of the second reader element,
upon determining that the change in the resistance of the first reader element is in an opposite direction of the change in the resistance of the second reader element, determine whether the change in the resistance of either reader element exceeds a threshold value, and
upon determining that the change in the resistance of either reader element exceeds the threshold value, generate an alarm in the storage device.

17. The system of claim 16, wherein upon determining that the change in the resistance of either reader element exceeds a threshold value, the field detection module is configured to further cause read/write heads containing the first reader element and the second reader element to be removed from the recording surfaces of the storage medium.

18. The system of claim 16, wherein upon generating the alarm, read/write operations in the storage device are halted.

19. The system of claim 16, wherein the resistance of the first reader element and the second reader element is monitored while read/write heads containing the first reader element and the second reader element are parked.

20. The system of claim 16, wherein the resistance of the first reader element and the second reader element is monitored while read/write heads containing the first reader element and the second reader element are performing a read or write operation.

* * * * *